(12) United States Patent
Matsunami (10) Patent No.: US 11,898,982 B2
(45) Date of Patent: Feb. 13, 2024

(54) LIQUID HEATER APPARATUS

(71) Applicant: DENSO WAVE INCORPORATED, Aichi-pref. (JP)

(72) Inventor: Katsuhiro Matsunami, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 542 days.

(21) Appl. No.: 17/007,640

(22) Filed: Aug. 31, 2020

(65) Prior Publication Data
US 2021/0080422 A1 Mar. 18, 2021

(30) Foreign Application Priority Data

Sep. 17, 2019 (JP) ................................. 2019-168330

(51) Int. Cl.
*G01N 27/406* (2006.01)

(52) U.S. Cl.
CPC ................................ *G01N 27/4067* (2013.01)

(58) Field of Classification Search
CPC .................................................. G01N 27/4067
See application file for complete search history.

(56) References Cited

U.S. PATENT DOCUMENTS

| | | | | |
|---|---|---|---|---|
| 4,611,562 A | * | 9/1986 | Nakano | G01N 27/4065 204/426 |
| 2005/0263397 A1 | * | 12/2005 | Yasui | G05D 23/2401 204/425 |
| 2016/0139073 A1 | * | 5/2016 | Mcquillen | G01N 27/4067 205/784.5 |
| 2016/0169138 A1 | * | 6/2016 | McQuillen | F02D 41/1494 219/497 |
| 2018/0231492 A1 | * | 8/2018 | Aoki | G01N 27/4067 |
| 2018/0231493 A1 | * | 8/2018 | Aoki | G01N 27/123 |
| 2018/0252671 A1 | | 9/2018 | Araki et al. | |
| 2020/0141892 A1 | * | 5/2020 | Aoki | G01N 27/4175 |

FOREIGN PATENT DOCUMENTS

| | | | |
|---|---|---|---|
| JP | H-0198818 A | * | 4/1989 |
| JP | 2003042444 A | * | 2/2003 |

\* cited by examiner

*Primary Examiner* — Joshua L Allen
*Assistant Examiner* — Vivian A Tran
(74) *Attorney, Agent, or Firm* — Oliff PLC (57) ABSTRACT

A liquid heater apparatus increases the temperature of an A/F sensor up to a target temperature by a target heating time. The liquid heating apparatus such as a gas water heater uses the A/F sensor for detecting an oxygen density in a heating tube. An MPU of a controller count a time from beginning by using a timer and decides whether a moisture on the A/F sensor is evaporated by using the change of a current for a heater portion of the A/F sensor. When the MPU decides the A/F sensor is dried out, the MPU counts the time from the beginning to such time tα as a drying time and setts a heating completing time by reducing the drying time from the predetermined target time. The MPU so controls the heating portion that the temperature of the sensor portion becomes the target temperature by the heating completing time.

5 Claims, 12 Drawing Sheets

LIQUID HEATER APPARATUS

CROSS-REFERENCE TO RELATED APPLICATION

This application is based on and claims the benefit of priority from earlier Japanese Patent Application No. 2019-168330 filed Sep. 17, 2019, the description of which is incorporated herein by reference.

BACKGROUND

1. Technical Field

The present description relates to a liquid heater apparatus having a heating tube for storing fuel in order to heat the liquid.

2. Related Art

Figure 10:
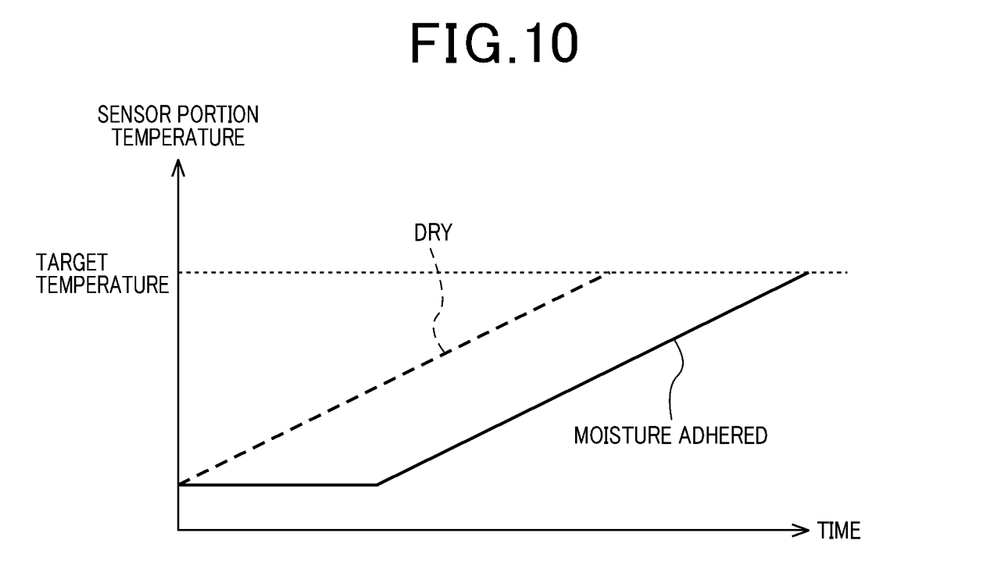
FIG. 10 is a timing chart showing the variation of the temperature of the A/F sensor according to the background.

The liquid heater apparatus such as a gas water heater device heating the liquid such as water uses an A/F sensor for detecting oxygen density within the heating tube which works as a heating cavity for storing the gas. In order to detect the oxygen density, the A/F sensor should be activated. So that the A/F sensor is heated by a heater portion to a predetermined target temperature. Occasionally, the A/F sensor is wet or iced, and the A/F sensor may be damaged when the same is heated suddenly. Therefore, as shown in FIG. 10, the A/F sensor is slowly heated for drying the A/F sensor at first, then is heated for increasing the temperature up to the target temperature for activating the A/F sensor.

SUMMARY

In the case a controller does not determine whether or not the water on the A/F sensor is completely dried, the electric energy for the heater portion is over consumed because the A/F sensor is heated more than the enough drying time. In the case the controller decides whether or not the A/F sensor is completely dried, the start timing when the A/F sensor could be used is not consistent, because the drying time of the heater is varied depending on the water condition on the A/F sensor.

The object of the present disclosure is providing the liquid heater apparatus which starts to use the A/F sensor within the predetermined target heating time.

The liquid heater apparatus of claim 1 has the A/F sensor for detecting the oxygen density within or close to the heating tube in which the fuel is stored for heating the liquid. A controller counts time from the beginning by a timer, and the controller decides whether or not the water covering the A/F sensor is completely dried by using a change of gradient of the current of the heating portion. The controller sets a drying time from beginning to a time when the moisture on said A/F sensor is completely evaporated, then the controller sets a heating completing time by reducing the drying time from the target heating time. The controller so controls the heating portion heats the A/F sensor that the temperature of the A/F sensor reaches the target temperature by the heating completing time.

When the water covering the A/F sensor is evaporated, both the temperature of the heater portion and the resistance value of the heater portion are increased simultaneously, so that the current of the heater portion is decreased. Therefore, the controller detects the drying condition by checking the current of the heater portion. The controller controls the heating completing time by using the drying time. Accordingly, the controller increases the temperature of the A/F sensor to the target temperature within the heating completing time, so that the controller does not waste the electric energy for heating the heater portion more than the enough drying time.

The controller of the liquid heater apparatus according to claim 2 so controls a voltage for the heater portion that gradient of temperature of the A/F sensor is calculated for reaching the temperature of the A/F sensor up to the target temperature by the heating completing time at first, a required electric energy is then calculated by using the gradient of temperature, and a voltage for the heater portion is then calculated by using the required electric energy. Accordingly, the controller could control the electric energy of the heater portion for increasing the temperature up to the target temperature within the heating completing time.

The controller of the liquid heater apparatus according to claim 3 decides whether the temperature of the A/F sensor reaches the target temperature by using the resistance value of the heater portion when the temperature of the heater portion is the target temperature. Accordingly, the controller could decide the temperature of the A/F sensor reaches the target temperature without using an additional thermometer.

The controller of the liquid heater apparatus according to claim 4 controls the electric energy for the heater portion in accordance with a change of resistance value of the heater portion while the A/F sensor is heated until the temperature of the A/F sensor reaches to the target temperature. So that the controller could control the electric energy of the heater portion for increasing the temperature of the A/F sensor up to the target temperature within the heating completing time avoiding the over reduction of the electric energy of the heater.

The controller of the liquid heater apparatus according to claim 5 presumes a presumption resistance value of the heater portion when the controller starts to control the voltage of the heater portion by using the gradient of the resistance value, then the controller controls the voltage of the heater portion by using the presumption resistance value. The controller could control the voltage of the heater portion more exactly.

DETAILED DESCRIPTION OF THE PREFERRED EMBODIMENTS

Embodiment 1

A first embodiment of the present description is explained hereinafter as using drawings of FIG. 1-FIG. 6. FIG. 6 shows a gas water heater as a-one example of a liquid heater apparatus 1. The water from the water supply system (not shown) is stored within a water tank 2 via a water inlet pipe 3. A heating tube 4 is installed in the water tank 2 so that the water in the water tank 2 is heated by the heating tube 4 while the gas is stored in the heating tube 4. The heated hot water is supplied to the outside via a water outlet pipe 5.

An air inlet tube 6 is connected to the water tank 2. A blower 7 is installed in the air inlet tube 6. The blower 7 is controlled by a blower controller 8 which is positioned an outside. The outside air is introduced within the air inlet tube 6 by the blower 7. A gas supply pipe 9 is connected to the middle position of the air inlet tube 6 via a control valve 10 which is controlled by an outside valve controller 11, so that the supply amount of the gas to the air inlet tube 6 is controlled.

The mixed gaseous matter of the air and the gas is supplied to the heating tube 4 via an injector 12. The mixed gaseous matter is ignited by an igniter (not shown) and then burned in the heating tube 4. The heating tube 4 is composed by a main part 4a an upper end of which is connected to the air inlet tube 6 and which is positioned vertically in the water tank 2, a turning part 4b which is positioned vertically from the bottom to the upper end of the water tank 2 and a spiral part 4c which surrounds the main part 4a from the upper end to the bottom. An outlet tube 13 is connected to the spiral part 4c so that exhaust gaseous matter is discharged to the outside from the water tank 2.

An A/F sensor 14 is positioned within the heating tube 4 at the right side of the injector 12. A sensor ammeter 15 positioned outside of the water tank 2 is connected to the A/F sensor 14. The sensor ammeter 15 measures an oxygen density in the heating tube 4 by sensing the current value of the A/F sensor 14 while the A/F sensor 14 is activated.

Figure 4:
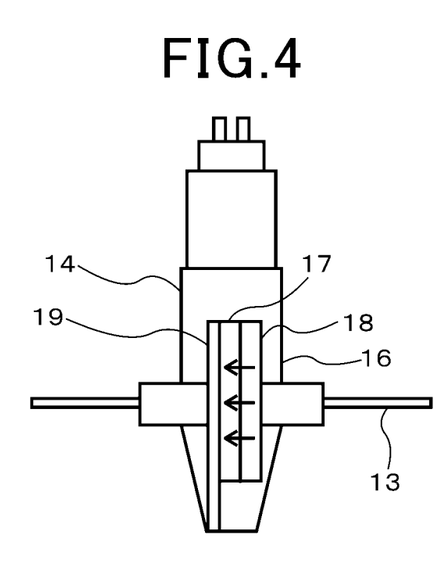
FIG. 4 is a schematic view of the A/F sensor.

As shown in FIG. 4, the A/F sensor 14 has a sensor portion 17 and a heater portion 18, both are positioned within a case 16. The case 16 has an air inlet port 19 through which an outside air is introduced into the case 16.

Figure 5:
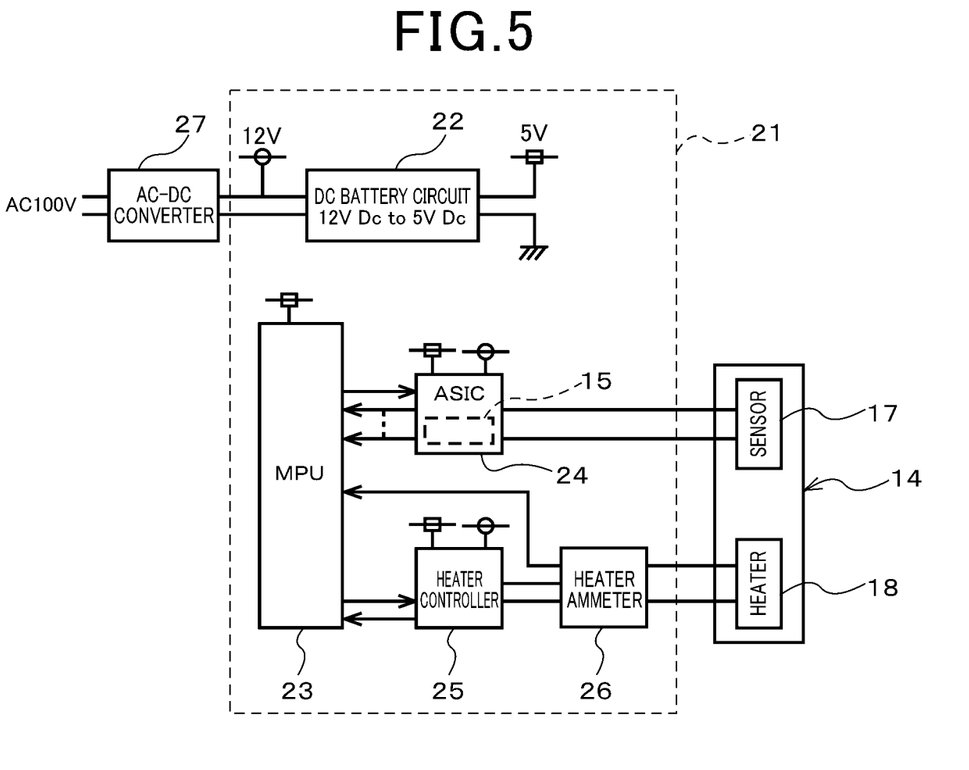
FIG. 5 is a block chart showing the sensor controlling circuit.
Figure 6:
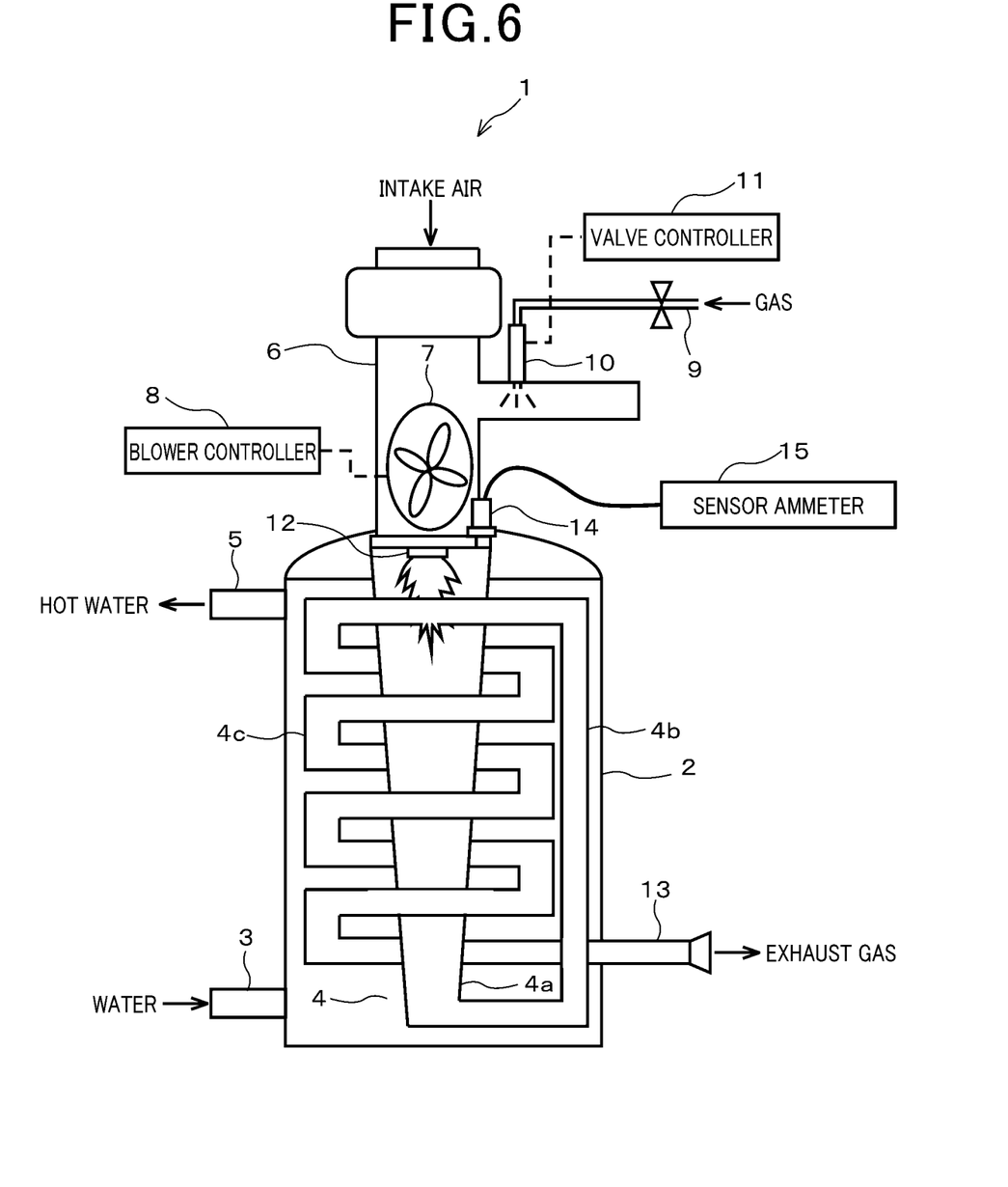
FIG. 6 is a schematic view of the gas water heater device.

The A/F sensor 14 is controlled by a sensor controlling circuit 21 which is shown in FIG. 5. The sensor controlling circuit 21 has a battery circuit 22, MPU (Micro Processing Unit) 23, ASIC (Application Specific IC) 24, a heater controller 25, and a heater ammeter 26. 12V of the direct current which is converted from 100V alternate current by an AC-DC converter 27 is supplied to the battery circuit 22. The battery circuit 22 produces the controlling current of 5V and supplies the controlling current to the MPU 23, the ASIC 24 and the heater controller 25. The power current of 12V is also supplied to the ASIC 24 and the heater controller 25.

The ASIC 24 is connected to the MPU 23 so that the data is transferred between the ASIC 24 and the MPU 23. Therefore, the ASIC 24 controls the sensor portion 17 under the direction from the MPU 23. The ASIC 24 also has the function of the sensor ammeter 15. The heater controller 25 is also connected to the MPU 23 and controls the heater portion 18 under the direction from the MPU 23. A heater ammeter 26, which may be considered a detector, is positioned between the heater portion 18 and the heater controller 25 and measures the current for the heater portion 18 such current is controlled by the heater controller 25. The detected current measured by the heater ammeter 26 inlets to the MPU 23.

Figure 1:
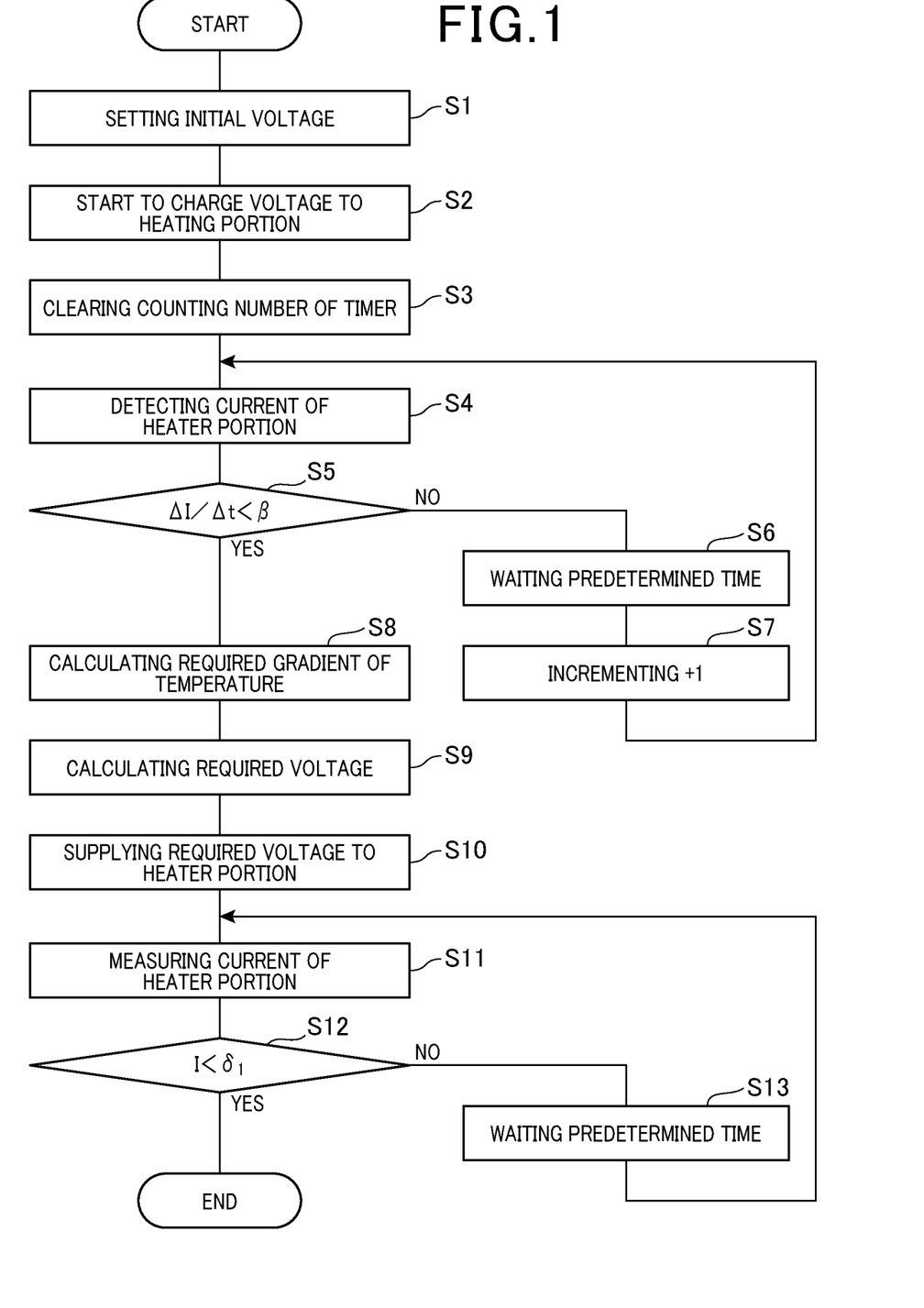
FIG. 1 is a flow chart of MPU of the sensor controlling circuit according to a first embodiment.

How to work of this first embodiment is explained hereinafter as siting FIGS. 1-3. FIG. 1 shows a flow chart of the sensor controlling circuit 21 the main character of which is the MPU 23.

In order to avoid incomplete combustion right after the gas is ignited, a purge processing for supplying an air and oxygen to the heating cavity in the heating tube 4 is carried out at first. The MPU 23 carries out the following process after the purge processing.

The target temperature for activating the sensor portion 17 is 750 degree centigrade, for example. The target heating time from starting to heat the sensor portion 17 to the temperature of the sensor portion 17 becomes the target temperature is 90 seconds, for example.

The MPU sets the initial voltage $E_0$ at first (S1). The initial electric energy $W_0$ is calculated by using the current I for the heater portion 18 and the resistance value $R(T)$ of the heater portion 18 at the temperature T, such as the following mathematical formula (1).

$$W_0 = E_0 \cdot I = E_0^2 / R(T) \quad (1)$$

The initial voltage $E_0$ is decided by the formula (1) by taking the initial electric energy $W_0$ which does not damage the sensor portion 17 by the rapid gradient of the temperature increase of the sensor portion 17.

When the initial electric energy $E_0$ is supplied to the heater portion 18 (S2), the MPU 23 clears the counting number of the software timer (S3) and detects the current to the heater portion 18 (S4). The detection of Step 4 is done every predetermined time $\Delta t$ of 100 m seconds, for example, which is counted by Step 6. $\Delta I$ is the difference of the current between last detected current and the newest detected current.

Whether or not the moisture on the A/F sensor 14 is dried out is decided by using the condition of $(\Delta I/\Delta t < \beta)$ at the following Step 5 while $\beta$ is a negative number and is predetermined for considering the accuracy of measuring. In the case the gradient of the detected current $(\Delta I/\Delta t)$ is greater than the predetermined value of $\beta$ (No), the count number of the timer of Step 6 is incremented at Step 7. In the case the gradient of the detected current $(\Delta I/\Delta t)$ is smaller than the predetermined value of $\beta$ (Yes), the dry out of the moisture on the sensor portion 17 is presumed, this presumption is explained later, and moves to Step 8.

The required gradient of the temperature $T_1$ for heating the A/F sensor 14 up to the target temperature within the target heating time is calculated at Step 8. The gradient $T_1$ is calculated by the following mathematic formula (2) while $t\alpha$ is the counting number of the timer.

$$T_1 = \text{(target temperature−present temperature)}/\text{(target heating time−}t\alpha\text{)} \quad (2)$$

(target heating time−$t\alpha$) means the remaining heating time. Target temperature−present temperature may be considered a required temperature. In the case "present temperature" is the temperature of the sensor portion 17 at the moment when "Yes" is decided at Step 5, $t\alpha$ is the drying time and the remaining heating time is the heating completing time. The temperature at the present time is calculated by the resistance value $R(T)$ which is calculated by the current value of the heater portion 18.

The required electric energy $W_1$ for obtaining the target temperature is, then, calculated by using the gradient $T_1$, and the required voltage $E_1$ for the heater portion 18 is calculated by using the required electric energy $W_1$ at Step 9. The required electric energy $W_1$ is calculated by the mathematic formula (3) while γ is a constant and the required voltage $E_1$ is calculated by the mathematic formula (4).

$$W_1 = T_1 \cdot \gamma \tag{3}$$

$$E_V = \{\sqrt{W_1 \cdot R(T)}\} \tag{4}$$

R(T) means the resistant value of the heater portion 18 at the present temperature.

The required voltage is supplied to the heater portion 18 at Step 10 and the current for the heater portion 18 is measured at Step 11. Whether or not the measured current I is smaller than $\sigma_1$ is decided at Step 12, while $\sigma_1$ is the current for the heater portion 18 at the resistant value at the target temperature R(750° C.).

$$\sigma_1 = E_1 / R(750° \text{ C.}) \tag{5}$$

In the case the current I is smaller than $\sigma_1$ (No), the routine counts a predetermined time at Step 13 which is the same as done at Step 6, and in the case the current I becomes larger than $\sigma_1$ (Yes), the routine is ended.

Figure 2:
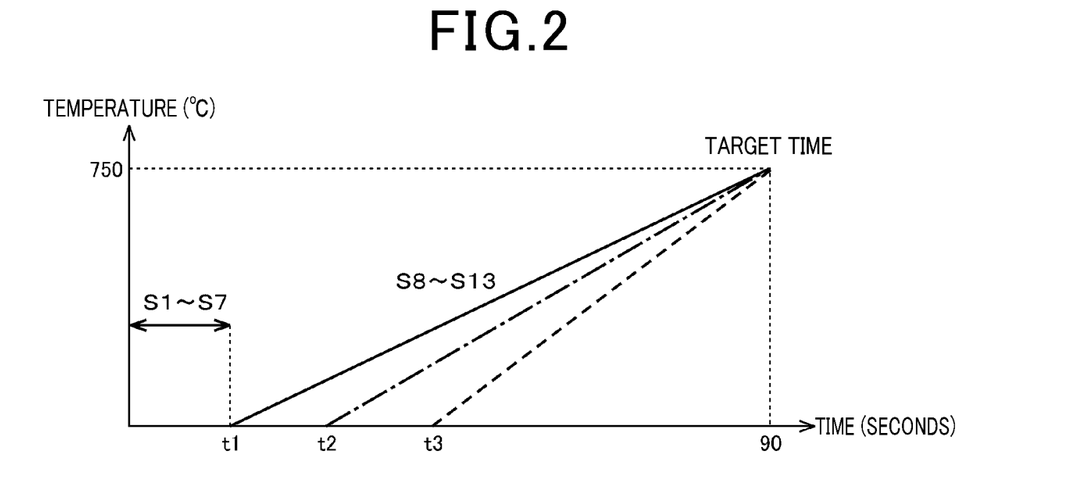
FIG. 2 is a timing chart of the variation of the temperature of the sensor portion controlled according to the flow shown in FIG. 1.

The time chart showing the gradient of the temperature of the sensor portion 17 which is controlled by the steps described in FIG. 1 is displayed in FIG. 2. The times t1, t2 and t3 in the horizontal axis show the time from the start of Step 2 to the decision of "Yes" at Step 5. Namely, the times t1, t2 and t3 mean the drying time to for evaporating the moisture on the sensor portion 17. The temperature of the sensor portion 17 is kept in the same value while the water on the sensor portion 17 is evaporating. According to the present disclosure, the temperature of the sensor portion 17 reaches up to 750° C. of the target temperature by 90 seconds of the target heating time by the routines of Step 8-Step 13, even the drying time to is varied between the time t1 and the time t3.

Figure 3A:
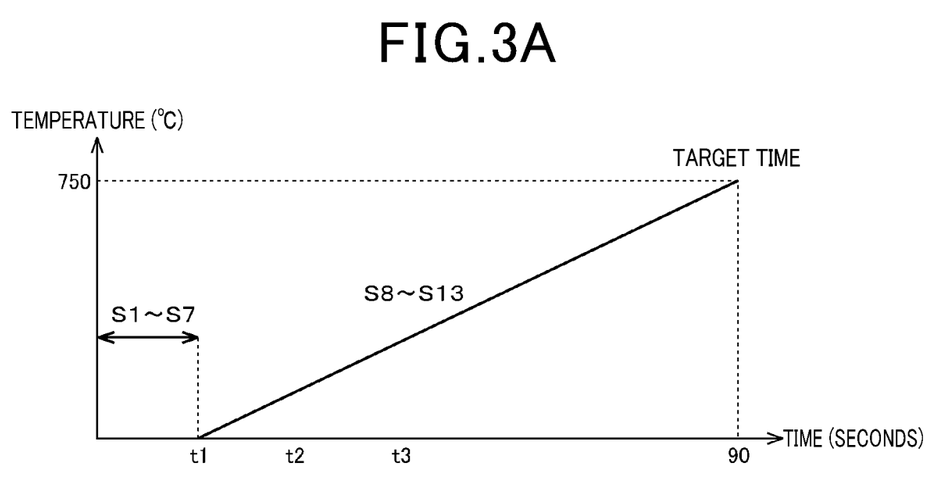
FIG. 3A is a timing chart when tα is t1.
Figure 3B:
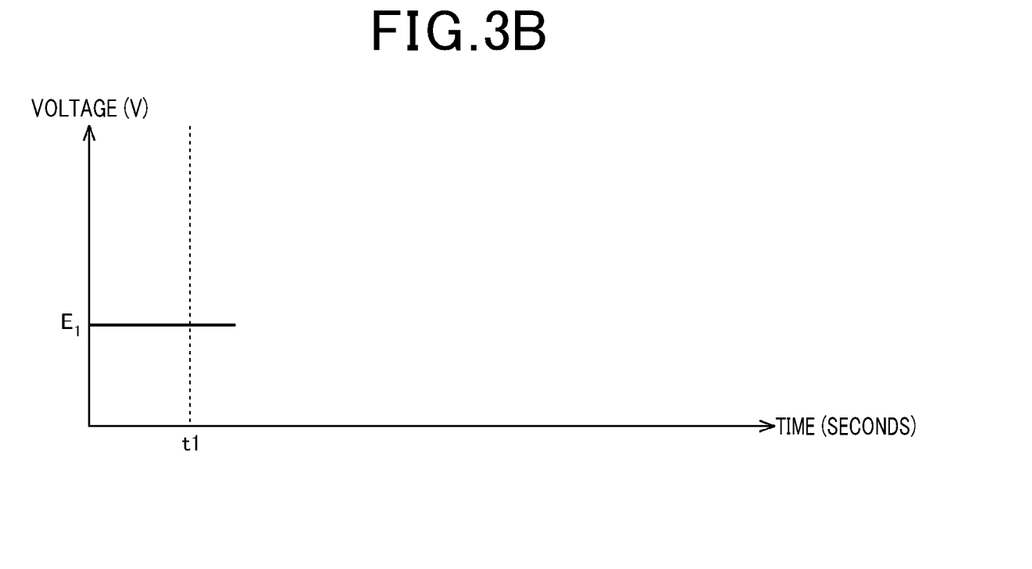
FIG. 3B is a timing chart showing the voltage of the sensor portion.
Figure 3C:
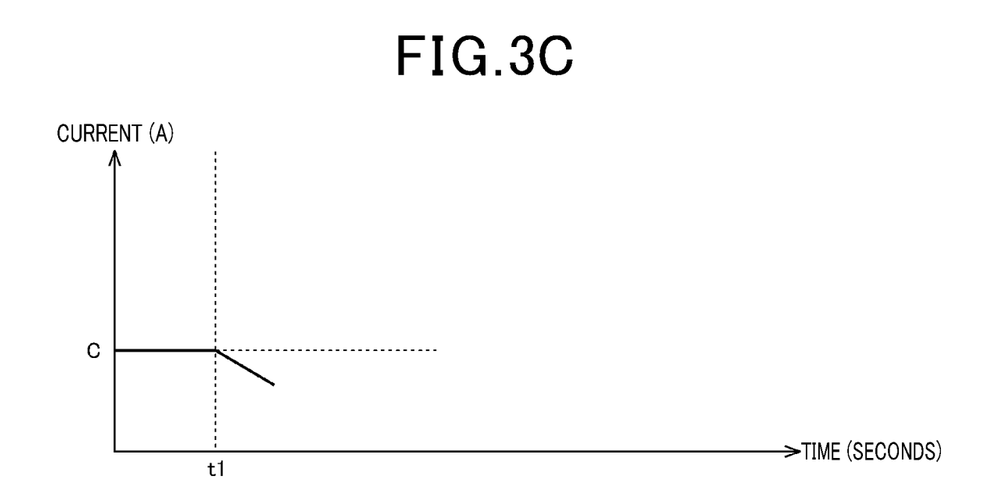
FIG. 3C is a timing chart showing the current of the sensor portion.

As shown in FIGS. 3A-3C, in the case the drying time tα equal to the time t1 (tα=t1), since the temperature of the sensor portion 17 starts to increase after the entire water on the sensor portion 17 is evaporated, the resistance value becomes to increase and the measured current I becomes to reduce. This phenomenon is detected at Step 5.

According to the present disclosure, the A/F sensor 14 detects the oxygen density in the heating tube 4 in which the gas is stored for heating the water supplied from the water inlet pipe 3. The MPU 23 decides whether or not the moisture on the sensor portion 17 is completely evaporated by using the change of the measured current I. Once the MPU 23 founds the dry out, the MPU 23 calculates the heating completing time by reducing the spending time (the drying time ta) from the target heating time, and the MPU 23 controls the heater portion 18 so as to reach the target temperature on such heating completing time.

Since the MPU 23 controls that the temperature of the sensor portion 17 becomes the target temperature on the target heating time even the spending time (the drying time ta) for evaporating the moisture is varied, the electric energy for the heater portion 18 is not wasted by heating the heater portion 18 more than enough time.

In other words, the MPU 23 calculates the gradient of the temperature $T_1$ for increasing the temperature of the sensor portion 17 up to the target temperature by the target heating time, then the MPU 23 calculates the required electric energy $W_1$ corresponding to the gradient of the temperature $T_1$, after that the MPU 23 calculates the voltage $E_1$ for the heater portion 18 corresponding to the required electric energy $W_1$.

As the MPU 23 can decide the temperature of the sensor portion 17 reaches the target temperature by using the resistance value R(750° C.) of the target temperature, the present disclosure can eliminate an additional thermometer.

Embodiment 2

Figure 7:
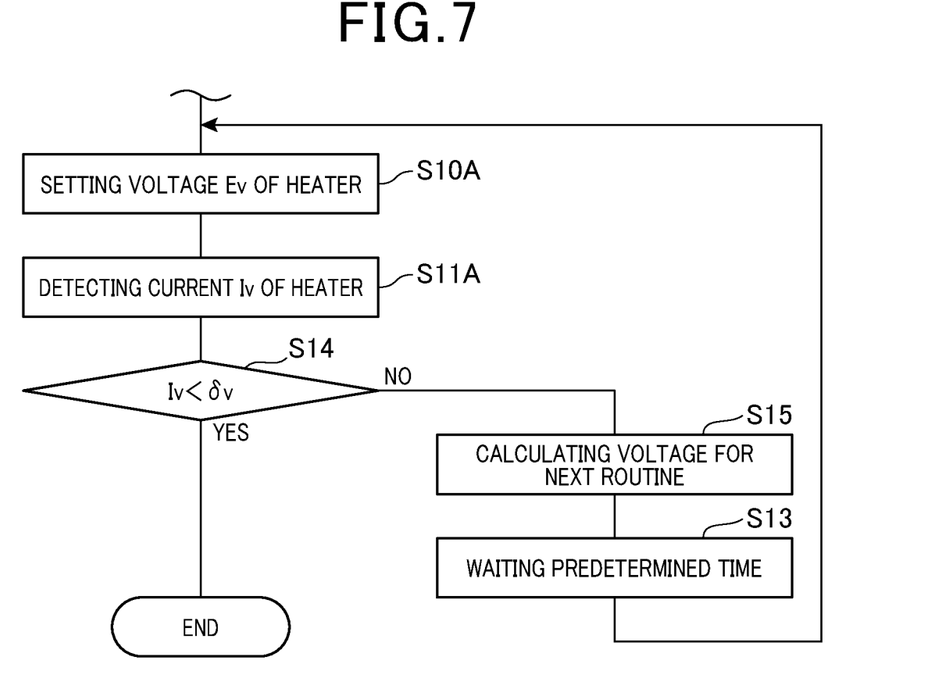
FIG. 7 is a flow chart of a part of FIG. 1 according to a second embodiment.

The explanation relating to the same portion as to the first embodiment is skipped by adding the same numeral on the corresponding portion. This second embodiment uses Step 14 instead of Step 12 of the first embodiment as shown in FIG. 7. When "No" is founded at Step 14, the routine returns to Step 10A via Step 15 and Step 16.

The voltage for the heater portion 18 is fixed value $E_1$ at Step 10 of the first embodiment, on the other hand the voltage for the heater portion 18 is variable value $E_V$ at Step 10A of the second embodiment. The measured current $I_v$ measured at Step 11A is compared with the comparing current calculated by the following formula $\sigma_v$ at Step 14.

$$\sigma_V v = E_V / R(750° \text{ C.}) \tag{6}$$

The voltage $E_V$ for Step 10A of next routine is calculated by the mathematic formula (7) at Step 15.

$$E_V = W_1 / I_V \tag{7}$$

Since the resistant value R(T) is increasing due to the increment of the sensor portion 17 heated by the heater portion 18, the measured current $I_V$ measured at Step 11A is varied. Accordingly, because the voltage $E_V$ is calculated by the mathematic formula (7), the voltage $E_V$ for the heater portion 18 could be set so as to keep the electric energy $W_1$ for the heater portion 18 constant though the resistance value R(T) is varied depend on the time.

As described above, the MPU 23 controls the voltage $E_V$ for the heater portion 18 in accordance with the variation of the resistance value R(T) of the heater portion 18 varied due to the time while the sensor portion 17 is heated up to the target temperature. Therefore, the temperature of the sensor portion 17 could reach to the target temperature by the target heating time by avoiding the reduction of the electric energy for the heater portion 18.

Embodiment 3

Figure 8:
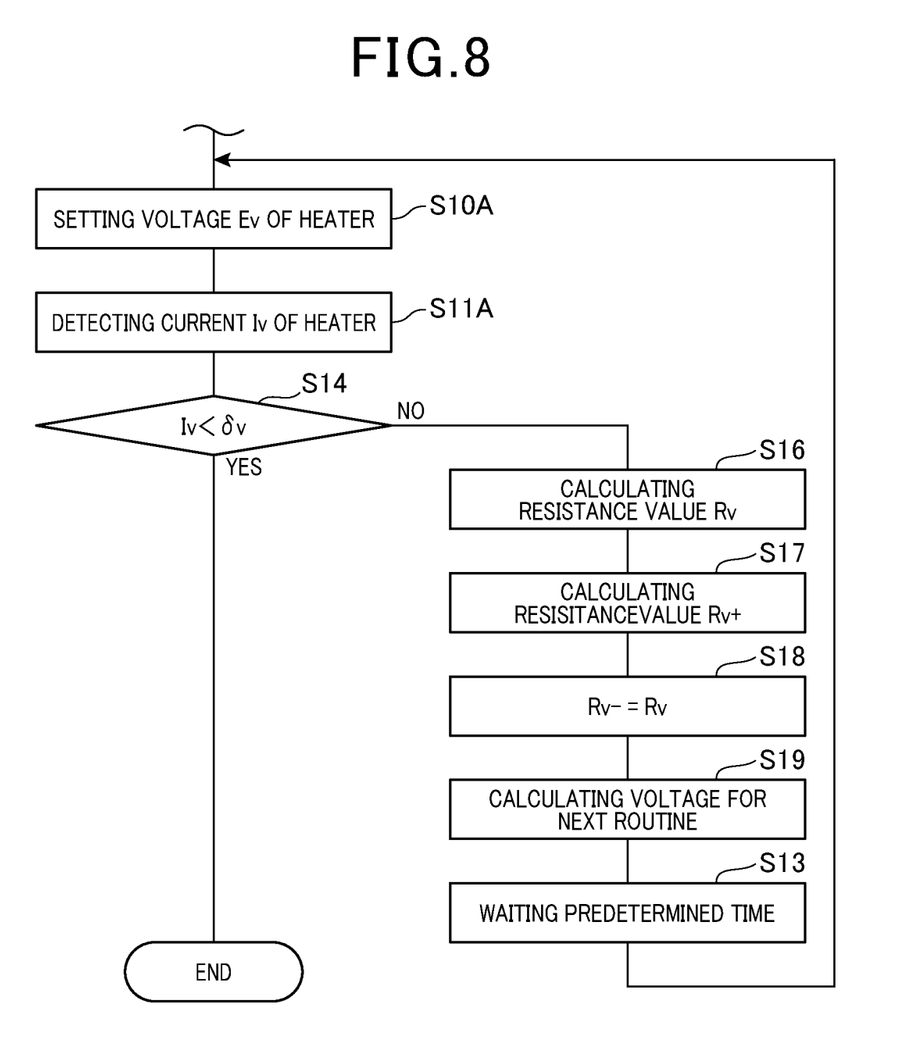
FIG. 8 is a flow chart of a part of FIG. 1 according to a third embodiment.

The third embodiment adds Steps 16-19 between Step 14 and Step 13 of the second embodiment as described in FIG. 8. The resistance value $R_V$ of each of the time is calculated by the mathematic formula (8) at Step 16.

$$R_V = E_V / I_V \tag{8}$$

Then, the presuming resistance value $R_{V+}$ is calculated by the mathematic formula (9) at Step 17, while the resistance value $R_{V-}$ is the calculated resistance value calculated by last Step 16.

$$R_{V+} = R_V + (R_V - R_{V-}) \tag{9}$$

Figure 9:
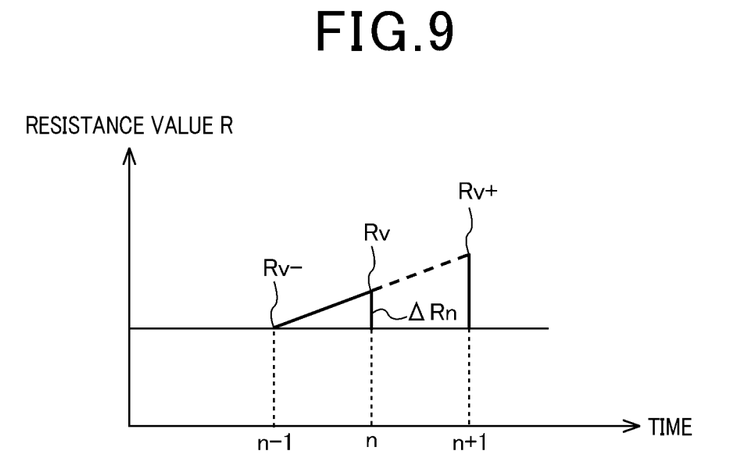
FIG. 9 is a timing chart showing the future resistance value.

As shown in FIG. 9, the resistance value $R_V$ represents the calculating resistance value of the present routine (n) of Step 16, the resistance value $R_{V-}$ represents the calculated resistance value of the last routine (n−1) of Step 16, and the resistance value $R_{V+}$ represents the presuming resistance value of the next routine (n+1) of Step 16.

The presuming voltage $E_V$ for the next routine of Step 10A is calculated by the mathematic formula (10) at Step 19 by using the present resistance value $R_V$ calculated this routine of Step 16 as the next resistance value $R_{V-}$.

$$E_V = \{\sqrt{W_1 \cdot R_{V+}}\} \tag{10}$$

According to the third embodiment, the MPU 23 uses the presuming resistance value $R_{V+}$ of the heater portion 18 for calculating the voltage $E_V$ of the next routine of Step 10A when the voltage $E_V$ is calculated at the present routine of Step 19. Therefore, the voltage $E_V$ for the heater portion 18 could be set more precisely.

The present description shall not be limited within the above embodiment, but have variations as follows.

The position of the A/F sensor 14 may be the middle of the heating tube 4 or end side of the heating tube 4 other than the base side of the heating tube 4. The A/F sensor 14 also may position at the outlet tube 13.

The exact figures of the target temperature, the target heating time, the timing for measuring the voltage and the current of the heater portion 18, and so on are not fixed but could be selected depend on each design.

The temperature of the heater portion 18 or the A/F sensor 14 could be measured by an outside thermometer.

This description may be used for the firewood stove when such firewood stove uses the A/F sensor.

The electric energy may shut down in predetermined timing by PWM (Pulse Width Modulation), while the current for the heater portion 18 is measured at the timing the electric energy for the heater portion 18 turns on.

What is claimed is:

1. A liquid heater apparatus comprising:
    a water tank connected to a water inlet pipe and to a water outlet pipe so that water enters the water tank via the water inlet pipe and is supplied to outside the water tank via the water outlet pipe;
    a heating tube installed in the water tank and connected to an injector so that mixed gaseous matter of air and gas is supplied to the heating tube, the mixed gaseous matter being ignited and burned in the heating tube and the water within the water tank being heated by the burned mixed gaseous matter;
    an A/F sensor for detecting an oxygen density within the heating tube;
    a heater for heating the A/F sensor;
    a detector for measuring a current of the heater;
    a timer for counting a time from a beginning of heating of the heater; and
    a controller for controlling an electric energy for the heater, wherein the controller:
    decides whether a gradient ($\Delta I/\Delta t$) of a changed current detected by the detector over a predetermined time measured by the timer is smaller than a predetermined negative number $\beta$;
    calculates a required temperature, which is a temperature difference between a target temperature on which the A/F sensor activates and a temperature of the A/F sensor at a drying time $t\alpha$, which is counted by the timer and which is a time length from a beginning time when the heater starts to be heated to the drying time when the gradient ($\Delta I/\Delta t$) of the changed current becomes smaller than the predetermined negative number $\beta$;
    calculates a remaining heating time, which is a time difference between a target heating time, which is a time from the beginning time when the heater starts to be heated to a reaching time when a temperature of the A/F sensor reaches the target temperature, and the drying time $t\alpha$;
    calculates a required electric energy W1 for increasing the temperature of the A/F sensor to the target temperature at the target heating time by using a gradient T1 of the required temperature over the remaining heating time; and
    controls the electric energy for the heater by using the required electric energy W1.

2. The liquid heater apparatus of claim 1, wherein the controller controls a voltage for the heater by using the required electric energy W1.

3. The liquid heater apparatus of claim 1, wherein when the temperature of the heater is the target temperature, the controller decides whether the temperature of the A/F sensor reaches the target temperature by using a resistance value of the heater.

4. The liquid heater apparatus of claim 1, wherein the controller calculates a present resistance value of the heater by using the required electric energy W1 and a present current value detected by the detector at a present temperature, and
wherein the controller controls a voltage of the heater for keeping the required electric energy W1 constant although a resistance value of the heater is varied.

5. The liquid heater apparatus of claim 4, wherein the controller:
    calculates the resistance value of the heater by using the required electric energy W1 and the present current value detected by the detector at the present temperature;
    calculates a next presumed resistance value by using a resistance value difference between a resistance value of a last time and the present resistance value; and
    controls the voltage of the heater by using the next presumed resistance value.

* * * * *